(12) United States Patent
Ott et al.

(10) Patent No.: US 6,469,804 B1
(45) Date of Patent: Oct. 22, 2002

(54) METHOD OF OBTAINING COLORIMETRIC VALUES

(75) Inventors: Hans Ott, Regensdorf (CH); Nikolaus Pfeiffer, Heidelberg; Manfred Schneider, Bad Rappenau, both of (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/186,853

(22) Filed: Nov. 5, 1998

(30) Foreign Application Priority Data

Nov. 6, 1997 (DE) .......................... 197 49 063

(51) Int. Cl.[7] .................................................. B06J 1/00
(52) U.S. Cl. .................... 358/1.9; 358/501; 382/162; 382/164
(58) Field of Search .................... 358/1.9, 501, 504, 358/534, 502, 523, 1.8; 382/162, 164, 165; 101/365, 350.1, 211

(56) References Cited

U.S. PATENT DOCUMENTS

| | | | | |
|---|---|---|---|---|
| 4,200,932 A | * | 4/1980 | Schramm et al. | 364/519 |
| 4,649,502 A | * | 3/1987 | Keller et al. | 364/519 |
| 4,660,159 A | * | 4/1987 | Ott | 364/526 |
| 4,665,496 A | * | 5/1987 | Ott | 364/526 |
| 4,884,221 A | * | 11/1989 | Sugiyama et al. | 364/526 |
| 4,975,862 A | * | 12/1990 | Keller et al. | 364/526 |
| 5,031,535 A | * | 7/1991 | Kipphan et al. | 101/483 |
| 5,068,810 A | * | 11/1991 | Ott | 364/526 |
| 5,122,977 A | * | 6/1992 | Pfeiffer | 364/551.01 |
| 5,182,721 A | * | 1/1993 | Kipphan et al. | 364/526 |
| 5,384,859 A | * | 1/1995 | Bolza-Schunemann et al. | 382/1 |
| 5,530,656 A | * | 6/1996 | Six | 364/526 |
| 5,543,940 A | * | 8/1996 | Sherman | 358/518 |
| 5,551,342 A | * | 9/1996 | Fuchs et al. | 101/484 |
| 5,734,801 A | * | 3/1998 | Noguchi et al. | 395/109 |
| 5,740,079 A | * | 4/1998 | Shigemori et al. | 364/526 |
| 5,957,049 A | * | 9/1999 | Ammeter et al. | 101/211 |
| 5,967,033 A | * | 10/1999 | Pfeiffer et al. | 101/211 |

FOREIGN PATENT DOCUMENTS

| | | | | |
|---|---|---|---|---|
| DE | 4415486 | * | 11/1995 | B41F/33/10 |
| DE | 19515499 | * | 3/1997 | B41F/33/10 |
| EP | 0142470 | * | 5/1985 | B41F/33/00 |
| EP | 0143744 | * | 6/1985 | B41F/33/00 |
| EP | 0228347 | * | 7/1987 | B41F/33/00 |
| EP | 228 347 | | 10/1989 | |
| EP | 0527285 | * | 2/1993 | B41F/33/00 |
| EP | 0659559 | * | 6/1995 | B41F/33/00 |
| GB | 2288571 | * | 10/1995 | B41F/33/10 |
| GB | 2289018 | * | 11/1995 | B41F/33/00 |
| WO | WO-95/00336 | * | 1/1995 | B41F/33/00 |

\* cited by examiner

*Primary Examiner*—Edward Coles
*Assistant Examiner*—Tia A. Carter
(74) *Attorney, Agent, or Firm*—Kenyon & Kenyon

(57) ABSTRACT

To obtain colorimetric values intended for regulating inking on a printing press (1) from a printed image (3) produced by the printing press (1), the printed image is measured calorimetrically in a plurality of pixels (4) with respect to a selected color coordinate system. The color vectors thus obtained for each pixel (4) are used to calculate color difference vectors to predetermined reference color vectors based on the same color coordinate system or reference color vectors determined from a reference printed sheet (3). The color difference vectors are multiplied by a weighting factor determined from the ink coverage of the pixels (4) and/or the color differences between the pixels (4) and their neighboring pixels (4). The color difference vectors weighted in this way can then be used as colorimetric values for regulating the inking on the printing press (1).

11 Claims, 1 Drawing Sheet

METHOD OF OBTAINING COLORIMETRIC VALUES

FIELD OF THE INVENTION

The present invention concerns a method of obtaining calorimetric values from a printed image produced by a printing press for use in regulating coloration by a printing press.

RELATED TECHNOLOGY

Coloration is regulated to advantage on modern printing presses, in offset printing in particular, by color difference control. A typical color difference control method is described in European Patent No. 228,347 B2 and German Patent No. 195 15 499 C2, for example. In this method, a printed sheet printed with the printing press is measured calorimetrically in numerous test areas with regard to a selected color coordinate system. Using the color coordinates thus obtained, color difference vectors with respect to theoretical color coordinates based on the same color coordinate system are calculated. These color difference vectors are converted to change in layer thickness vectors with the help of calorimetric value gradients, and the ink management of the printing press is regulated on the basis of the change in layer thickness vectors converted from the color difference vectors. Fields of color control strips printed along with the actual printed image are used as test areas.

Meanwhile, scanning devices known as scanners have become known in general, making it possible to perform calorimetric or spectrophotometric measurements of the total image content of a printed sheet in a large number of relatively small pixels at a reasonable cost within a very short period of time. These scanners offer the essential prerequisites in terms of measurement technology for using not only concurrently printed test strips for ink management control on a printing press, but also the color information from all pixels of the entire actual printed image for this purpose.

For calculating the input quantities for the control device of the inking devices of the printing press, the color difference vectors of the scanned pixels of the printed sheet are analyzed in comparison with the corresponding pixels of an OK sheet or another reference, either directly or by the methods described in European Patent No. 228 347 B2. This direct analysis of color difference vectors as such is admissible if only the fields of color control strips printed together with the actual printed image or only a few specially selected test areas from the actual printed image are used as test areas. However, if the total image content, i.e., all or most of the pixels of the printed image, is to be used for analysis, this procedure fails entirely because the print conditions in the individual pixels normally differ greatly, or at least it leads to faulty control. The color difference vectors of the individual pixels thus cannot generally be used as such as a basis for further processing with in-image measurement.

SUMMARY OF THE INVENTION

Against the background of this related art, an object of the present invention is to improve upon a method of the generic type to the extent that it leads to colorimetric values suitable for inking control on a printing press even with in-image measurement.

The present invention provides a method of obtaining calorimetric values intended for regulating inking on a printing press from a printed image produced by the printing press, the printed image (3) being measured calorimetrically in a plurality of pixels (4) with regard to a selected color coordinate system; color difference vectors ($\Delta F$) with respect to predetermined reference color vectors based on the same color coordinate system, predefined or determined from a reference printed sheet (3) being calculated from the color vectors (F) thus obtained for each pixel (4), and these color difference vectors ($\Delta F$) being used as the colorimetric values (FMW) intended for regulating inking by the printing press (1). The present invention is characterized in that the color difference vectors ($\Delta F$) of the pixels (4) are multiplied by a weighting factor (g1; g2) which is determined from the ink coverage of the pixels (4) and/or the color differences between the pixels (4) and their neighboring pixels (4).

Especially advantageous embodiments and refinements include: (a) that the ink coverages of each pixel (4) with respect to the printing inks involved are determined; the weighting factor (g1) of a pixel (4) has a maximum value, in particular a value of 1, when the average or one of the ink coverages of the pixel (4) exceeds a predetermined first threshold value, in particular a value of 10%, and otherwise the weighting factor (g1) has a smaller value, in particular a value of 0; (b) that the ink coverages of each pixel (4) are determined with respect to the printing inks involved; the weighting factor (g1) of a pixel (4) has a maximum value, in particular a value of 1, when the sum of the ink coverages of the respective pixel (4) falls below a predetermined threshold value, in particular a value of 250, and otherwise the weighting factor (g1) has a smaller value, in particular a value of 0; (c) that the color difference with respect to an unprinted location on the printed sheet (3) is determined for each pixel (4); the weighting factor (g1) of a pixel (4) has a value of 1 when the color difference between the pixel (4) and the unprinted location exceeds a predetermined second threshold value, in particular a value of 5, and the weighting factor (g1) otherwise has a smaller value, in particular a value of 0; (d) that for each pixel (4) the color differences in comparison with its immediately adjacent pixels (4) are determined; the weighting factor (g2) of a pixel (4) has a maximum value, in particular a value of 1, when the sum of the color differences falls below a predetermined third threshold value, in particular a value of 8, and the weighting factor (g2) otherwise has a smaller value approaching 0 with an increasing sum of the color differences; (e) that for each pixel (4) a weighting factor (g) is determined, obtained by multiplication of the weighting factor (g2) calculated on the basis of the color differences between the pixel (4) and its neighboring pixels (4) by the weighting factor (g1) calculated on the basis of the ink coverages of or the color difference between the pixel (4) and an unprinted location on the printed sheet (3); and (f) that the ink coverage difference between a pixel (4) and its neighboring pixels (4) is used to determine the weighting factor (g2).

BRIEF DESCRIPTION OF THE DRAWING

The present invention is explained in greater detail below on the basis of the drawing, wherein.

DETAILED DESCRIPTION

Figure 1:
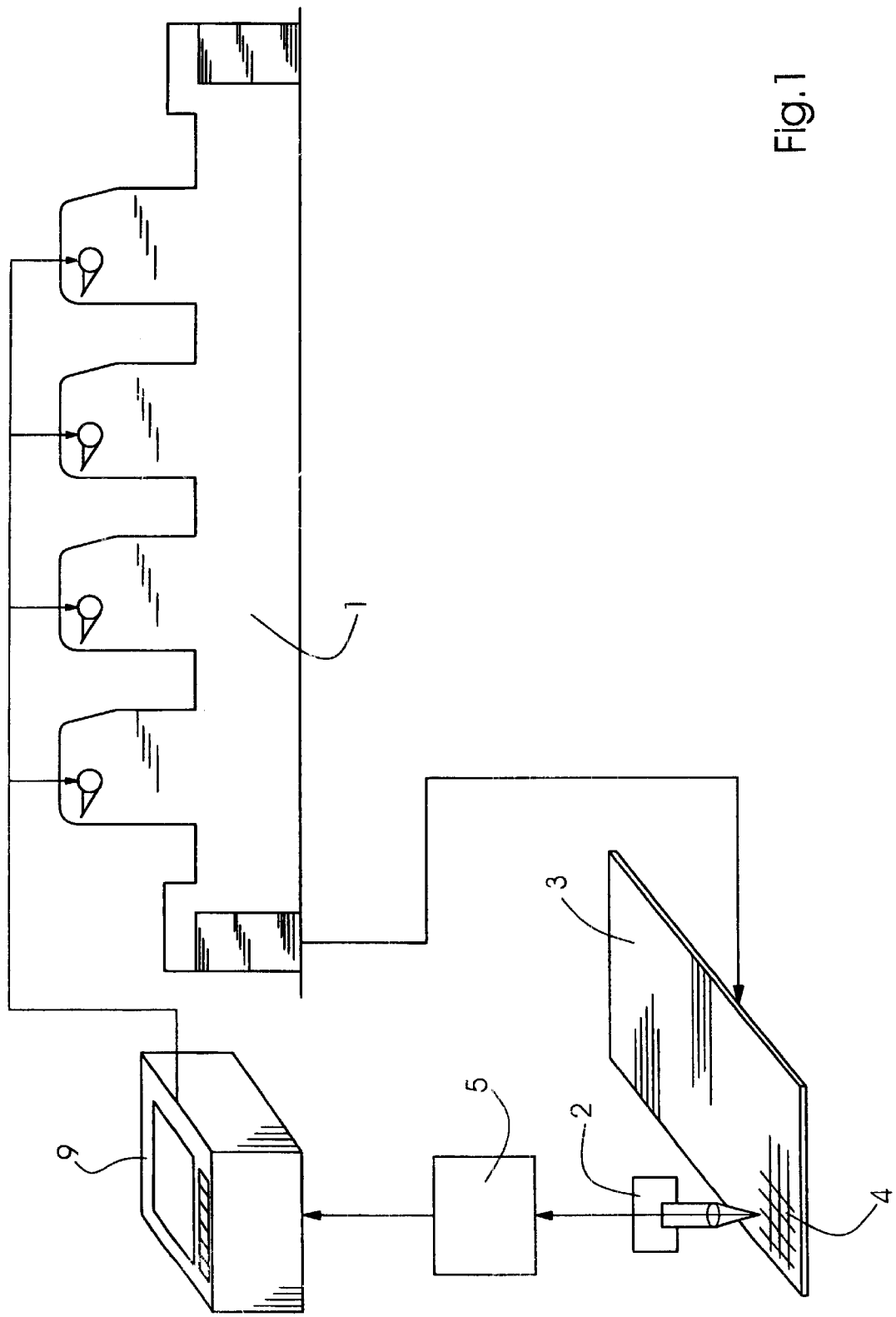
FIG. 1 shows a schematic diagram of the open- or closed-loop control for a printing press.

According to FIG. 1, a printing press 1, in particular a multi-color offset printing press, produces printed sheets 3 having the desired printed image and optionally also printing control elements. Printed sheets 3 are taken from the ongoing print run and sent to a spectrophotometric scanner 2, which scans printed sheets 3 essentially over the entire surface pixel by pixel. The size of individual pixels 4 is typically approximately 2.5 mm×2.5 mm, corresponding to approximately 130,000 pixels 4 on a printed sheet 3 of the usual dimensions. The scanning values (typically spectral reflectance values) produced by the scanner are analyzed in an analyzer 5 and processed to input quantities for a control unit 9 which is provided for printing press 1 and in turn controls the inking devices of the printing press in accordance with these input quantities. At least in the case of an offset printing press 1, these input quantities are typically zonal layer thickness changes for the individual printing inks involved in printing. The above-mentioned input quantities or layer thickness changes are determined by comparing the scanning values or quantities derived therefrom, in particular calorimetric values (color loci or color vectors) of an OK sheet, with the corresponding quantities of a printed sheet obtained from the ongoing printing run in the sense that the changes in settings of the coloration devices of the printing press brought about by the input quantities or layer thickness changes result in the best possible matching of the perceived color of the printed sheets from ongoing production to the OK sheet. For comparison purposes, another reference can be used instead of an OK sheet, e.g., corresponding setpoints or values obtained from the pre-press stages.

The arrangement outlined here corresponds essentially to traditional arrangements described in detail in German Patent No. A 44 15 486 and methods of regulating coloration on printing presses 1 and therefore it needs no further explanation for those skilled in the art.

Color values (color coordinates, color vectors, color loci) with respect to a selected color space are calculated from the reflectance values of the visible spectral range produced by scanner 2. A perceptually equidistant color space, typically the L, a, b color space according to the CIE (Commission Internationale de l'Eclairage) is preferably selected for this. Calculation of color values L, a, b from the spectral reflectance values of the visible spectral range by analyzer device 5 has been standardized by the CIE and therefore requires no further explanation here. For the sake of thoroughness, it should be pointed out that color values L, a, b (or corresponding values of another color space) could be determined using suitable color measurement equipment even without spectral scanning.

The color vectors F=(L, a, b) available for pixels 4 after scanning a printed sheet 3 form the basis for calculating the input quantities for printing press control system 9. These calculations are also performed in analyzer 5.

The color difference between one pixel 4 and a reference pixel 4 or a corresponding pixel 4 of a reference, typically an OK sheet 3, or another pixel 4 on same printed sheet 3 shall be designated as color difference $\Delta F$, which is calculated by the equation:

$$\Delta F = (\Delta L, \Delta a, \Delta b) = F_i - F_r = (L_i - L_r, a_i - a_r, b_i - b_r)$$

where the values with subscript i are those of a specific pixel 4, and the values with subscript r are those of the components of the color vector of reference pixel 4 or corresponding pixel 4 of OK sheet 3 or those of aforementioned other pixel 4 of same printed sheet 3. The color vectors of pixels 4 of OK sheet 3 or another reference are often referred to as reference color vectors. Color difference $\Delta E$ between two pixels is understood to be the absolute value of the respective color difference vector $\Delta F$, i.e.

$$\Delta E = |\Delta F| = \{((L_i - L_r)^2 + (a_i - a_r)^2 + (b_i - b_r)^2)\}^{0.5}$$

where subscripts i and r again have the same meanings as given above.

Analyzer 5 calculates color difference vector $\Delta F$ for each pixel 4 of printed sheet 3 from color vectors F determined on this sheet and reference color vectors determined on OK sheet 3 or otherwise. Colorimetric values FMW are formed from color vectors F and color difference vectors $\Delta F$, with the input quantities required for printing press control system 9 ultimately being derived from these calorimetric values. The latter can be accomplished according to the teaching of European Patent No. 228 347 B2, for example.

In the case of a zonally designed printing press, the following discussion applies equally to pixels 4 of one printing zone or all printing zones.

For calculation of calorimetric values FMW according to the present invention from color difference vectors $\Delta F$, pixels 4 and their color difference vectors $\Delta F$ are weighted by a method which takes into account the influence of the ink coverages of the printing inks involved and that of positioning errors.

According to a first aspect of the present invention, it is advantageous for the subsequent further processing of colorimetric values FMW to yield the above-mentioned input quantities for color control system 9 if pixels 4 with relatively low ink coverage values below an initial threshold are taken into account with a lower weighting or not at all. In particular, pixels 4 with ink coverage values lower than 10% should be disregarded. Consequently, a first weighting factor g1 which is not dependent upon ink coverage is defined according to the present invention as follows:

g1=1 for ink coverage $\geq$10% and
g1=0 for ink coverage <10%.

Since color values L, a, b of color vector F are approximately proportional to the ink coverages, the first weighting factor is preferably defined as follows on the basis of color difference $\Delta E$ of pixel 4 from an unprinted location on printed sheet 3 (i.e., paper white):

g1=1 for $\Delta E_p^2 \geq 5^2$ and
g1=0 for $\Delta E_p^2 < 5^2$, where $\Delta E_p^2$ is the square of the color difference between pixel 4 and the unprinted location on the printed sheet (paper white). Instead of the value $5^2$, a different second threshold value may also be used.

The influence of positioning errors is taken into account by a second weighting factor g2 according to a second aspect of the present invention. It is assumed according to the present invention that pixels 4 in a homogeneous environment are relatively insensitive to positioning errors. A homogeneous environment is understood to mean that the color differences between pixel 4 and its eight adjacent pixels 4 are relatively small and are below a third threshold. In this case, the second weighting factor is set at g2=1. The second weighting factor is reduced with increasing color differences. Second weighting factor g2 can be determined, for example, as follows:

g2=1 for $\Delta E^M \leq 8$ and
g2=$(8/\Delta E^M)$ for $\Delta E^M > 8$, where $\Delta E^M$ denotes the sum of the color differences between pixel 4 and its eight neighboring pixels 4. A definition of second weighting factor g2 which is preferred because the calculations are less complicated is given by the following equation:

g2=1 for $\Delta E^{M2} \leq 8$ and
g2=$(8/\Delta E^{M2})^{0.5}$ for $\Delta E^{M2} > 8$, where $\Delta E_{M2}$ denotes the sum of the squares of the color differences between pixel 4 and its eight neighboring pixels 4.

The two weighting factors g1 and g2 may be used alternatively, or according to another aspect of the present invention, combined to form a combined weighting factor g which is an individual value for each pixel 4, according to g=g1*g2.

Color difference vectors ΔF of individual pixels 4 are then weighted by multiplication by one of the two weighting factors g1 and g2 or preferably by a combined weighting factor g formed from them by multiplication. Color difference vectors of individual pixels 4 weighted in this way form calorimetric values FMW according to the present invention; these values can then be analyzed further for controlling the inking devices of the printing press.

According to one variant, weighting factor g2 can also be determined from the ink coverage differences in comparison with adjacent pixels 4, and the color differences between pixels 4 and adjacent pixels 4 can be disregarded. Weighting factor g2 is then calculated from the equation:

$$g2=1/(1+\Delta Fd^2),$$

where ΔFd denotes the maximum ink coverage difference between a pixel 4 and its eight neighbors.

If desired, black ink may also be included in the calculation of the input quantities for the printing press control or in the calculation of colorimetric values FMW needed for these input quantities. In this case, printed sheets 3 are measured not only in the visible spectral range (approx. 400–700 nm) but also in at least one position in the near infrared, where only black ink has any non-negligible absorption. Reflectance spectra of individual pixels 4 then include not only the reflectance values in the visible spectral range but also at least one reflectance value in the near infrared range. The reflectance value in the near infrared is converted to an infrared value I corresponding qualitatively to brightness value L of the color space.

This is done by analogy with the formula for calculating L according to the equation:

$$I = 116 \cdot \sqrt[3]{\frac{Ii}{Iin}} - 16$$

where $I_i$ denotes the infrared reflectance measured in respective pixel 4, and $I_{in}$, denotes the infrared reflectance measured on an unprinted location on printed sheet 3. Like brightness value L, infrared value I can therefore assume only values of 0 to 100. Color vector F is expanded to four dimensions with infrared value I as the fourth component. Accordingly, color difference vectors ΔF and their color differences ΔE form absolute values in four dimensions. In the computational equations for defining weighting factors g1 and g2, the contribution of infrared value I is taken into account by appropriate adjustment of the threshold values.

What is claimed is:

1. A method of obtaining colorimetric values for regulating inking on a printing press from a printed image produced by the printing press comprising:
   measuring calorimetrically the printed image at a plurality of pixels using a selected color coordinate system;
   calculating a color difference vector for each of the plurality of pixels with respect to a predetermined reference color vector based on the selected color coordinate system, the predetermined reference color vector being predefined or determined from a reference printed sheet; and
   multiplying the color difference vector of the pixel by at least one weighting factor, the at least one weighting factor being a function of at least one of an ink coverage of the pixel and a color difference between the pixel and neighboring pixels of the pixel.

2. The method as recited in claim 1 further comprising determining the ink coverage of each pixel for each printing ink used for the printed image, a first weighting factor of the at least one weighting factor having a maximum value when an average of the ink coverages or one of the ink coverages of the pixel exceeds a predetermined first threshold value, otherwise the first weighting factor having a second value smaller than the maximum value.

3. The method as recited in claim 2 wherein the maximum value equals one, the first threshold value equals 10%, and the second value equals zero.

4. The method as recited in claim 1 further comprising determining the ink coverage of each pixel for each printing ink used for the printed image, a first weighting factor of the at least one weighting factor having a maximum value when a sum of the ink coverages of the respective pixel falls below a predetermined threshold value, otherwise the first weighting factor having a second value smaller than the maximum value.

5. The method as recited in claim 4 wherein the maximum value equals 1, the threshold value equals 250 and the second value equals zero.

6. The method as recited in claim 1 wherein the ink coverage of the pixel is determined as a function of a color difference with respect to an unprinted location on a printed sheet for each of the plurality of pixels, a first weighting factor of the at least one weighting factor having a maximum value when the color difference between the pixel and the unprinted location exceeds a predetermined second threshold value, otherwise the first weighting factor having an other value smaller than the maximum value.

7. The method as recited in claim 6 wherein the maximum value equals 1, the second threshold value equals 5 and the other value equals zero.

8. The method as recited in claim 1 wherein for each pixel of the plurality of pixels, the color differences with respect to each of the neighboring pixels of the pixel are determined, a second weighting factor of the at least one weighting factor of the pixel having a maximum value when a sum of the color differences falls below a predetermined third threshold value, otherwise the second weighting factor having a smaller value approaching zero as the sum of the color differences increases.

9. The method as recited in claim 8 wherein the maximum value equals 1 and the third threshold value equals 8.

10. The method as recited in claim 8 wherein for each pixel a third weighting factor of the at least one weighting factor is determined, the third weighting factor being obtained by multiplication of the second weighting factor and a first weighting factor of the at least one weighting factor, the first weighting factor being a function of the ink coverage of the pixel, wherein the ink coverage of the pixel is capable of being determined as a function of a color difference between the pixel and an unprinted location on a printed sheet.

11. The method as recited in claim 1 wherein the at least one weighting factor is determined as a function of an ink coverage difference between the pixel and the neighboring pixels of the pixel.

* * * * *